United States Patent [19]

Hayman

[11] Patent Number: 4,765,590
[45] Date of Patent: Aug. 23, 1988

[54] FAUCET VALVE WITH DIAGONAL SEALING RING

[75] Inventor: Dennis J. Hayman, Birmingham, Mich.

[73] Assignee: United States Brass Corporation, Plano, Tex.

[21] Appl. No.: 78,588

[22] Filed: Jul. 28, 1987

Related U.S. Application Data

[63] Continuation of Ser. No. 930,318, Nov. 12, 1986, abandoned.

[51] Int. Cl.[4] .............................................. F16K 5/04
[52] U.S. Cl. .................................. 251/310; 251/314; 251/900
[58] Field of Search ...................... 251/310, 314, 900

[56] References Cited

U.S. PATENT DOCUMENTS

| | | | |
|---|---|---|---|
| 1,567,389 | 12/1925 | Rubly | 251/310 |
| 2,484,723 | 10/1949 | Pain | 251/310 |
| 2,621,886 | 12/1952 | Mueller | 251/310 X |
| 3,166,097 | 1/1965 | Hinderer et al. | 251/310 X |
| 3,815,871 | 6/1974 | Carlson | 251/310 |

Primary Examiner—Arnold Rosenthal
Attorney, Agent, or Firm—Wm. T. Wofford; James C. Fails; Arthur F. Zobal

[57] ABSTRACT

An improved faucet valve utilizes a static diagonal sealing ring which coacts with a control member cylindrical flow control portion having a tapered lower end portion in a relationship that provides: substantially 180 degrees of control member rotation from full open to full close and vice versa, with metering of fluid flow taking place over a major portion of the control member rotational range; contact of nearly all of the sealing ring inner periphery with the control member flow control portion during initial opening and final closing stages when differential pressure is high, so there is no tendency for the sealing ring to be forced out of its grooves; the diagonal sealing ring does not move past a fluid discharge opening or vice versa, so the diagonal sealing ring is not subjected to chafing which would result in excessive wear.

2 Claims, 2 Drawing Sheets

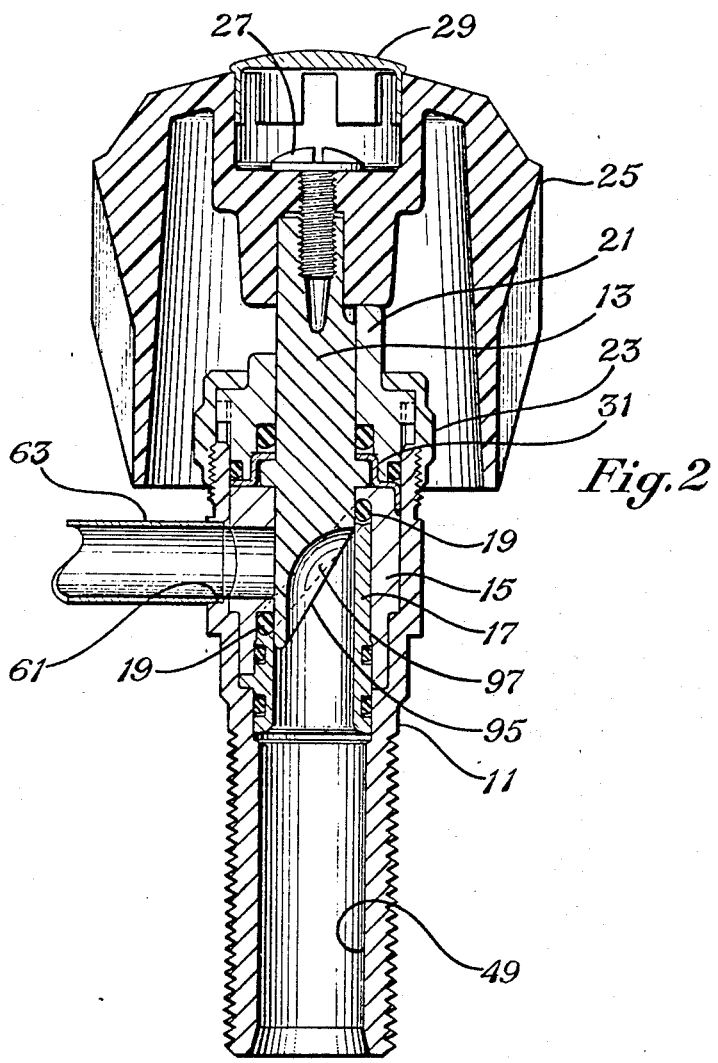
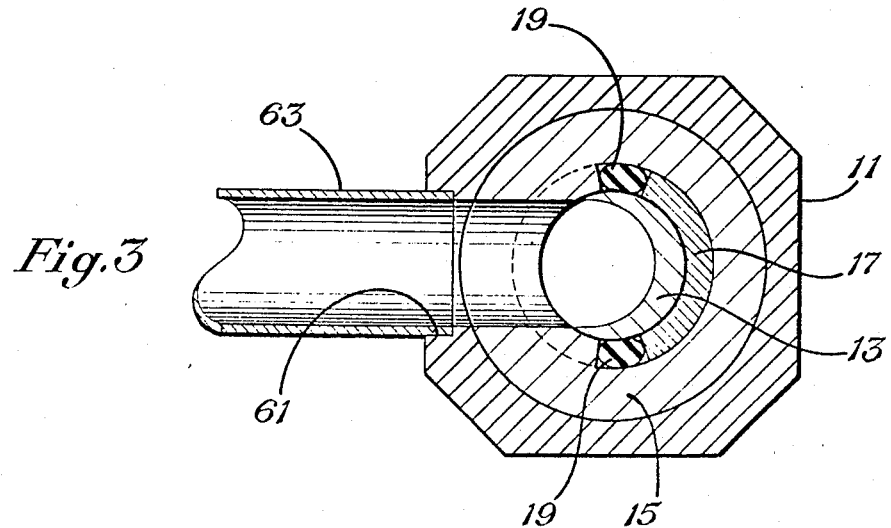

FAUCET VALVE WITH DIAGONAL SEALING RING

This application is a continuation of application Ser. No. 06/930,318, filed 11-12-86 and now abandoned.

FIELD OF INVENTION

The invention relates to faucet valves of the type used for kitchen sinks, lavatories, bath tubs, showers, and the like; and more particularly to an improved structure and metering arrangement utilizing a diagonal sealing ring.

DESCRIPTION OF THE PRIOR ART

There are numerous examples in the prior art of which I am aware, of the utilization of diagonal sealing rings including diagonal O-ring seals in valves including faucet valves. Exemplary of such prior art patents are U.S. Pat. Nos. 2,484,723, 2,621,886, 2,695,036, 2,631,002, 3,166,097, 3,815,871, 3,874,637 and 4,004,775.

In some of the prior art patents, such as U.S. Pat. Nos. 2,631,002, 3,166,097, 3,815,871, 3,874,637 and 4,004,775, the diagonal sealing ring is not static and must be moved past a port the edges of which can cause damage to the seal. In others of the prior art patents, such as U.S. Pat. Nos. 2,484,723 and 2,621,886, the diagonal sealing ring is static but a port must be moved past the seal, and the port edges can cause damage to the seal. In some of the prior art patents, such as U.S. Pat. Nos. 2,484,723, 2,621,886 and 2,631,002, a movable port must be aligned with a fixed port and metering of the fluid flow takes place over only a small rotational angle (as little as 30 degrees), with resulting wasted motion and poor metering control. In some of the prior art patents, such as U.S. Pat. Nos. 2,695,036, 3,815,871, 3,874,637 and 4,004,775, a relatively large portion of the diagonal sealing ring is exposed when the valve is in the early stages of opening and the final stages of closing and is thus subjected to maximum differential pressure forces which tend to force the sealing ring out of its groove or seat, with resulting valve malfunction.

The objective of this invention is to provide an improved faucet valve which utilizes a diagonal sealing ring and which is free of the disadvantages above mentioned.

SUMMARY OF THE INVENTION

In accordance with the present invention there is provided a valve body having a bottom fluid inlet passage and a side fluid discharge passage. Upper and lower sleeve members are disposed in the inlet passage with suitable sealing means disposed between the sleeve members and the valve body. The upper and lower sleeve members each have an interior cylindrical surface of the same diameter, and have complimentary oppositely facing diagonal grooves for receiving and retaining a diagonal sealing ring, which is preferably an O-ring. The configuration and orientation of the grooves is such that the central axes of the discharge passage and the sealing ring intersect, and the sealing ring is symmetrically disposed about an imaginary cylindrical projection of the discharge passage. There is further provided a control member that has a flow control portion which has a cylindrical exterior surface that is matingly received within the interior cylindrical surfaces of the upper and lower sleeve members. The control member flow control portion has a length sufficient to extend beyond the upper and lower extremities of the diagonal sealing ring. The control member flow control portion has a tapered lower end portion, with the taper beginning at a point adjacent the upper extremity of the discharge passage and extending downward and inward to the end of the flow control portion. The tapered lower end portion includes an appropriately shaped flow direction transition surface designed to effectively direct fluid flow from the inlet passage to the discharge passage. The control member is rotatable through substantially 180 degrees from the full open to the full close position, and vice versa. The sealing ring is in contact with the exterior surface of the control member flow control portion over a major portion of the sealing ring inner periphery during the initial stages of opening and final stages of closing of the valve, when differential pressure is high. The metering of fluid flow extends over a major portion of the control member rotational range. The diagonal sealing ring does not move past a fluid discharge opening or vice versa, so the diagonal sealing ring is not subjected to chafing which would result in excessive wear.

Some advantages of the valve of the present invention are that there is no tendency for the sealing ring to be forced out of its grooves by high differential pressure; the valve metering action takes place over a major portion of the control member rotational range; and the sealing ring is not subjected to chafing which would result in excessive wear.

BRIEF DESCRIPTION OF DRAWINGS

FIG. 2 is a longitudinal section view like FIG. 1, but with the faucet valve in the full closed position.

FIG. 3 is a section view, taken at III—III of FIG. 1.

DESCRIPTION OF PREFERRED EMBODIMENT

Figure 1:
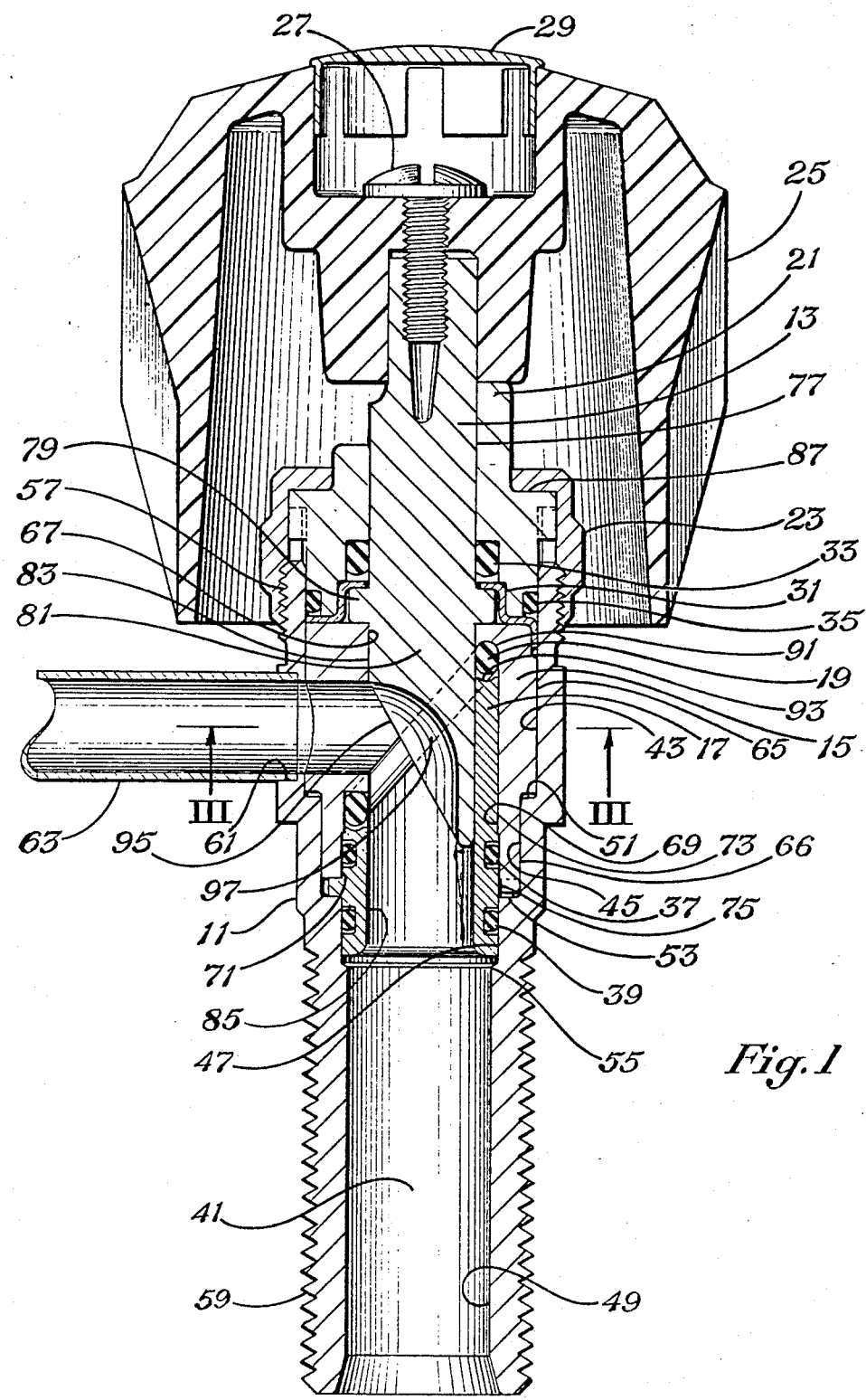
FIG. 1 is a longitudinal section view showing the entire assembly for a single faucet valve in accordance with a preferred embodiment of the invention and showing the valve in the full open position.

The faucet valve assembly includes a valve body 11, a control member 13, upper and lower sleeve members 15, 17, diagonal O-ring 19, retaining member 21, bonnet nut 23, handle 25, handle retainer screw 27, plug button 29, control member retainer washer 31, control member stem portion sealing member 33, and static sealing members 35, 37, 39.

The valve body 11 is generally cylindrical and has a central cavity 41 formed by upper, intermediate, lower and inlet bores 43, 45, 47, 49, having successively smaller diameters. Adjacent bores are joined by respective first, second and third shoulders 51, 53, 55. The upper exterior portion of the valve body 11 is provided threads 57 to receive the bonnet nut 23 and the lower exterior portion is provided threads 59 to receive mounting retainer parts and connections to a fluid supply source (not shown). The valve body 11 has an outlet opening or discharge passage 61 communicating with the valve body central cavity via the sidewall of the upper bore 43. The outlet opening 61 is connected to a suitable spout (not shown) via a conduit 63.

The upper sleeve member 15 is generally cylindrical, having exterior cylindrical surfaces 65, 66 that mate respectively with the upper and intermediate bores 43, 45 of the valve body 11, and having upper, intermediate and lower interior cylindrical surfaces 67, 69, 71 of successively increasing diameter.

The lower sleeve member 17 is also generally cylindrical, having a first exterior cylindrical surface 73 that mates with the intermediate interior cylindrical surface 69 of the upper sleeve member 15 and a second exterior cylindrical surface 75 that mates with the lower intermediate cylindrical surface 71 of the upper sleeve member 15, as well as with the lower bore 47 of the valve body 11.

The control member 13 is generally cylindrical and has a stem portion 77, a flange portion 79 and a flow control portion 81. The flow control portion 81 has a cylindrical exterior surface 83 that mates with the upper interior cylindrical surface 67 of the upper sleeve member 15, as well as with the cylindrical interior surface 85 of the lower sleeve member 17. The retaining member 21 has a generally cylindrical shape and has a cylindrical exterior surface that mates with the upper bore 43 of the valve body 11, and an interior cylindrical surface that mates with the cylindrical surface of the control member stem portion 77. The handle 25 is retained on the stem portion 77 by the usual screw 27, and the handle screw receiving cavity is closed by the usual plug button. A projection on the handle 25 coacts with usual stop means on the retaining member 21 to permit 180 degrees of handle rotation and hence 180 degrees of control member rotation, which will permit the faucet valve to move from the full closed to the full open position and vice versa.

The bonnet nut 23 has a usual configuration including threads that engage the threads 57 at the upper end of the valve body 11 and an end wall 87 that engages a shoulder on the retaining member 21 to clamp the retaining member, the control member retainer washer 31, the upper and lower sleeve members 15, 17, and the control member 13 all in their proper assembled relationships. Sealing between the lower sleeve member 17 and the valve body 11, the upper and lower sleeve members 15, 17 and the retainer member 21 and the valve body 11, is provided by respective O-rings 39, 37, 35. Sealing between the retainer member 21 and the control member stem portion 77 is provided by O-ring 33.

The valve body 11, retaining member 21, and upper and lower sleeve members 15, 17 are provided the usual type slots and/or projections for retaining and proper orientation purposes.

The upper and lower sleeve members 15, 17 are provided complimentary opposite facing diagonal grooves 91, 93 for receiving and retaining the diagonal O-ring 19. The configuration of the grooves 91, 93 and their orientation when the valve is assembled is such that the central axes of the discharge passage 61 and the O-ring 19 intersect, with the O-ring 19 being symmetrically disposed about an imaginary cylindrical projection of the discharge passage 61.

The flow control portion 81 of the control member 13 has a length sufficient to extend beyond the upper and lower extremities of the diagonal O-ring 19. The flow control portion 81 further has a tapered lower end portion 95, with the taper beginning with the point adjacent the upper extremity of the discharge passage 61. The tapered end portion 95 includes a flow direction transition surface 97.

A valve constructed in accordance with the present invention has several advantages over the valves of the prior art of which I am aware. During the initial stages of opening or the final stages of closing of the valve, during which times the differential pressure is high, the O-ring is in contact with the control member flow control portion exterior surface over a major portion of the inner periphery of the O-ring. Consequently, the O-ring is not susceptible to being forced out of its grooves by the high differential pressure. The valve metering action begins when the control member has been rotated only a few degrees away from the full open position and continues until the control member is only a few degrees away from the full closed position, and vice versa. Consequently, metering of the fluid flow takes place over a major portion of the control member rotational range. The diagonal O-ring is static, and accordingly does not move past a fluid discharge opening, nor does a fluid discharge opening move past the diagonal O-ring; instead, the control member flow control portion cylindrical exterior surface is moved past the static diagonal O-ring. Consequently, the diagonal O-ring is not subjected to chafing which would result in excessive wear.

The diagonal sealing ring is preferably an O-ring, but could be of other configurations without departing from the principles of the present invention. The materials of the upper and lower sleeve members, the control member and the retaining member are preferably moldable plastic, such as acetal.

The foregoing disclosure and the showings made in the drawings are merely illustrative of the principles of this invention and are not to be interpreted in a limiting sense.

I claim:

1. A faucet valve comprising:
   a. a valve body having a bottom fluid inlet passage and a side fluid discharge passage having a central axis,
   b. upper and lower sleeve members disposed in said inlet passage,
      i. said upper and lower sleeve members each having an interior cylindrical surface of the same diameter,
      ii. said upper and lower sleeve members having complimentary oppositely facing diagonal grooves for receiving and retaining a diagonal sealing ring,
   c. a diagonal sealing ring having a central axis and disposed in said grooves,
      i. the configuration and orientation of said grooves being such that the central axes of said discharge passage and said sealing ring intersect and said sealing ring is symmetrically disposed about an imaginary cylindrical projection of said discharge passage,
   d. a control member having a flow control portion,
      i. said flow control portion having a cylindrical exterior surface that is matingly received within said interior cylindrical surfaces of said upper and lower sleeve members and having length sufficient to extend beyond the upper and lower extremities of said diagonal sealing ring,
      ii. said flow control portion having a lower end portion that includes a flow direction transition surface,
   e. said control member being rotatable substantially 180 degrees from a full open position to a full closed position and vice versa, with said sealing ring being in contact with the exterior surface of said control member flow control portion over a major portion of the sealing ring inner periphery during the initial stages of opening of the valve when differential pressure is high, and with metering of fluid flow extending over a major portion of the control member rotatinal range;

whereby there is provided a faucet valve with the combination of a static, diagonally disposed seal and a flow control portion that is rotatable and throttling throughout the major portion of its rotation and without moving any control port past said diagonal sealing ring so as to prevent seal damage due to cutting, chaffing, or excessive wear, and so as to prevent seal blowout due to high differential pressure because of a relatively narrow throttling range.

2. The device of claim 1 wherein said sealing ring is an O-ring.

* * * * *